(12) United States Patent
Danielsen

(10) Patent No.: US 11,754,044 B1
(45) Date of Patent: Sep. 12, 2023

(54) METHOD FOR INSTALLING AN ADD-ON DEVICE ON A WIND TURBINE BLADE

(71) Applicant: General Electric Company, Schenectady, NY (US)

(72) Inventor: Darren John Danielsen, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/743,626

(22) Filed: May 13, 2022

(51) Int. Cl.
*F03D 7/02* (2006.01)

(52) U.S. Cl.
CPC ......... *F03D 7/0296* (2013.01); *F03D 7/0224* (2013.01); *F05B 2230/60* (2013.01); *F05B 2260/96* (2013.01)

(58) Field of Classification Search
CPC ...... F03D 7/0296; F03D 7/0224; F03D 80/00; F03D 80/50; F03D 3/04; F05B 2230/60; F05B 2260/96; F05B 2230/80
See application file for complete search history.

(56) References Cited

U.S. PATENT DOCUMENTS

| | | | |
|---|---|---|---|
| 9,316,202 B2 | 4/2016 | Bech | |
| 10,337,540 B2 | 7/2019 | Wardropper et al. | |
| 2021/0079896 A1* | 3/2021 | Herrig | F03D 3/04 |

\* cited by examiner

*Primary Examiner* — Lee A Holly
(74) *Attorney, Agent, or Firm* — Dority & Manning, P.A.

(57) ABSTRACT

A method is provided for installing a continuous pliant add-on device (e.g., a vibration suppression device) onto a blade of a wind turbine, wherein the blade is mounted to a rotor that is atop a tower. The method includes, with the rotor, positioning the blade to a first position. A first end of the add-on device is fixed to a first end of the blade. The blade is then rotated with a pitch control system while supplying the add-on device in a first direction along a span of the rotating blade to wrap the add-on device around the blade towards an opposite second end of the blade in a first wrap pattern.

20 Claims, 10 Drawing Sheets

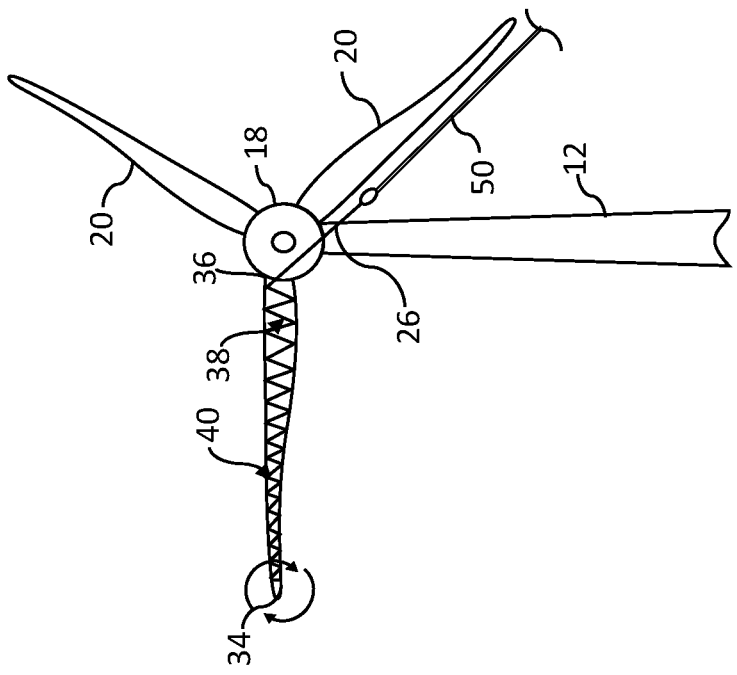
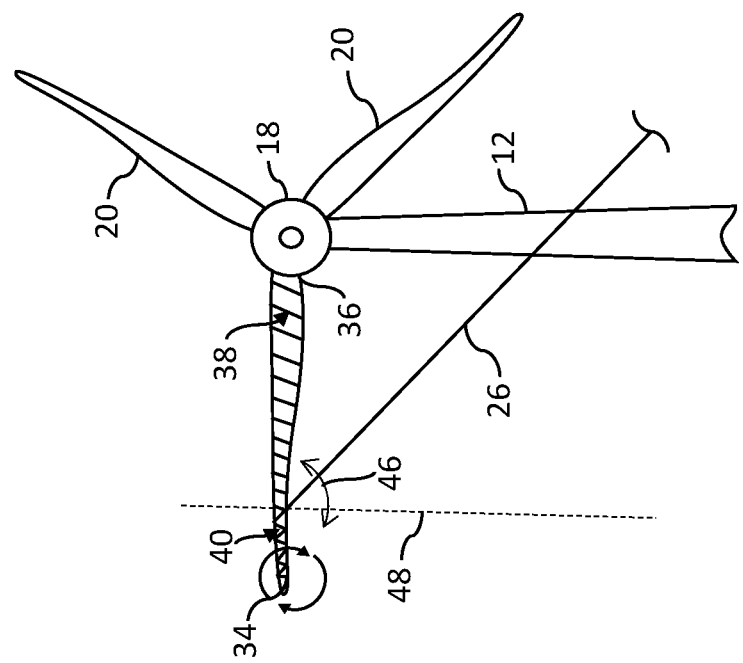
Fig. 3f
Fig. 3e

METHOD FOR INSTALLING AN ADD-ON DEVICE ON A WIND TURBINE BLADE

FIELD

The present subject matter relates generally to wind turbines, and more particularly to methods for installing an add-on device, such as a vibration suppression device, onto a wind turbine blade.

BACKGROUND

During installation, maintenance, repair, or other scenarios when the rotor of a wind turbine is either locked or idling, it may be desired to install an add-on device onto the blades of the wind turbine. The add-on device may relate, for example, to a vortex generator or other type of device that is intended to enhance aerodynamic performance of the blade. In a particular scenario wherein the rotor is locked or idling and is without yaw capability, it may be desired to install a temporary add-on device on the blades in the form of a vibrations suppression device to prevent stall or vortex induced vibrations from occurring. These vibration suppression devices can range in design, with varying shapes and sizes, and serve to increase drag, disrupt/influence airflow over the blade surfaces, or provide vibration damping.

The current procedures for installing the add-on devices present significant challenges. For example, the conventional solutions generally require a crane, cherry picker, or repelling expertise to install or attach the add-on devices at an uptower location at or near the blade root. These procedures are expensive in terms of necessary equipment (e.g., a crane or cherry picker), time-consuming, and can present health and safety concerns for personnel.

It would be desirable to provide a method for installation of an add-on device, such as a vibration suppression device, onto a wind turbine blade that is cost-effective, safe, and eliminates the need for a crane or other similar equipment at the wind turbine site.

BRIEF DESCRIPTION

Aspects and advantages of the invention will be set forth in part in the following description, or may be obvious from the description, or may be learned through practice of the invention.

In one aspect, the present disclosure is directed to a method for installing a continuous pliant add-on device onto a blade of a wind turbine, wherein the blade is mounted to a rotor that is atop a tower. The method is not limited to any particular type or purpose of the add-on device. The method includes using the rotor (e.g., rotating the rotor) to the position the blade to a first position desired for the installation process. A first end of the add-on device is fastened to a first end of the blade, which may be the root end of the blade. This can be done by a person within the rotor accessing the blade root through an access hatch in the nacelle or rotor. The blade is then rotated with the wind turbine pitch control system while supplying the add-on device in a first direction along a span of the rotating blade. This action causes the add-on device to wrap around the blade towards an opposite second end of the blade, which may be the tip end, in a first wrap pattern.

After completion of the first wrap pattern, it may be desired to supply the add-on device in an opposite second span-wise direction (i.e., back towards the blade root if the first end of the add-on device was attached to the root end of the blade) to wrap the add-on device around the blade back towards the root end of the blade in a second wrap pattern. In this manner, the add-on device can be tied off at the root end of the blade and accessed at a later time for removal of the device without the necessity for a crane or cherry picker.

In a particular embodiment, the blade is maintained at the first position (e.g., a 3 o'clock or 9 o'clock position) for wrapping the add-on device in the first and second wrap patterns.

In an alternate embodiment, the rotor is rotated to move the blade from the first position (e.g., a 5 o'clock position) to a second position (e.g., a 2 o'clock position) for wrapping the add-on device in the second wrap pattern. The first and second positions can vary. With this embodiment, the add-on device can be maintained at a generally constant orientation (e.g., a vertical orientation) from a ground-level control position for wrapping the add-on device in the first and second wrap patterns. This method can be useful when the area or space around the base of the wind turbine tower is constrained. For example, at certain sites, the area around the wind turbines may be surrounded by crops, forest, etc.

An embodiment of the method may include, at a ground level position proximate to a base of the tower, orienting the add-on device at a first downward angle away from a longitudinal axis of the tower while rotating the blade and paying out the add-on device to wrap the add-on device around the blade in the first wrap pattern. Once the add-on device has been wrapped to a first position at or near the opposite second end of the blade (e.g., the tip end), the add-on device may be oriented to a second downward angle relative to the longitudinal axis of the tower back towards to the tower, wherein the blade is then rotated with the pitch control system to wrap the add-on device around the blade back towards the root end of the blade in a second wrap pattern.

The method may include, prior to orienting the add-on device to the second downward angle, orienting the add-on device generally perpendicular to a span-wise axis of the blade while rotating the blade with the pitch control system to create a chord-wise wrap of the add-on device around the blade before the add-on device starts to wrap around the blade back to the root end of the blade.

In a certain embodiment, the first angle is maintained constant during wrapping of the add-on device so that the first wrap pattern is uniform along the blade. Alternatively, the first angle is varied during wrapping of the add-on device so that the first wrap pattern is non-uniform along the blade.

An embodiment of the method may include attaching an extension line to a second end of the add-on device, the extension line having a length so as to be paid out from the ground level position while the add-on device wraps around the blade.

The method may include attaching an extension line to the second end of the add-on device and controlling the extension line at a ground level position proximate to a base of the tower to orient the add-on device at the first angle and the second angle while wrapping the add-on device around the blade. The extension line can be disconnected from the second end of the add-on device after completing the second wrap pattern and connected to the blade.

In a particular embodiment of the method, the first wrap pattern and the second wrap pattern may cross at trailing and leading edges of the blade. Alternatively, the wrap patterns may cross at suction and pressure sides of the blade.

The add-on device can vary in size, shape, design, and purpose within the scope of the present methods. In one embodiment, the add-on device may be a continuous rope or hose. The add-on device may be specifically designed to function as a vibration suppression device.

In one embodiment, the add-on device is a vibration suppression device that includes a flexible tubular structure that wraps around leading and trailing edges of the blade, the flexile tubular structure including an internal line that limits elongation of the flexible tubular structure.

In an alternate embodiment, the vibration suppression device may be a rope with sections of increased diameter members spaced apart along the rope. This type of vibration suppression device can be wrapped around the blade such that the increased diameter members lie against suction and pressure sides of the blades and the rope wrapped around the leading and trailing edges of the blade.

Embodiments of the method may include providing means to minimize slippage of the add-on device along the blade so as to maintain the first wrap pattern of the add-on device. For example, such means may include serrations defined in the blade along at least a portion of a span-wise length of the blade.

In an alternative embodiment, the blade may include aerodynamic devices or features defined along a trailing edge of the blade, wherein gaps are defined between the aerodynamic devices in which the add-on device wraps around the trailing edge, the gaps preventing slippage of the add-on device along the blade.

In other embodiments, anchor devices are attached to the blade, the add-on device being attached to the anchoring devices. The anchor devices may be temporarily or permanently attached to the blade and do not affect aerodynamic performance of the blade.

In a different embodiment of the method, the add-on device is supplied from a root end of the blade through a diverter positioned adjacent to the blade, the diverter lowered towards the tip end as the blade rotates to wrap the add-on device in the first wrap pattern. The diverter may be held relative to the blade via a tag line attached to the diverter, the tag line controlled at a ground level position.

The above embodiment may include, after completion of the first wrap pattern, raising the diverter along the blade while supplying the add-on device through the diverter to wrap the add-on device around the blade back towards a root end of the blade in a second wrap pattern.

The invention also encompasses method embodiments for removing the add-on device from the blades in a generally opposite sequence of steps used to install the add-on device.

The present invention also encompasses the wind turbine blades having one or more of the add-on devices wrapped around the blade in one of the patterns as described herein.

The invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3a through 3f are sequential views of an embodiment for wrapping the add-on device around the wind turbine blade;

DETAILED DESCRIPTION

Figure 1:
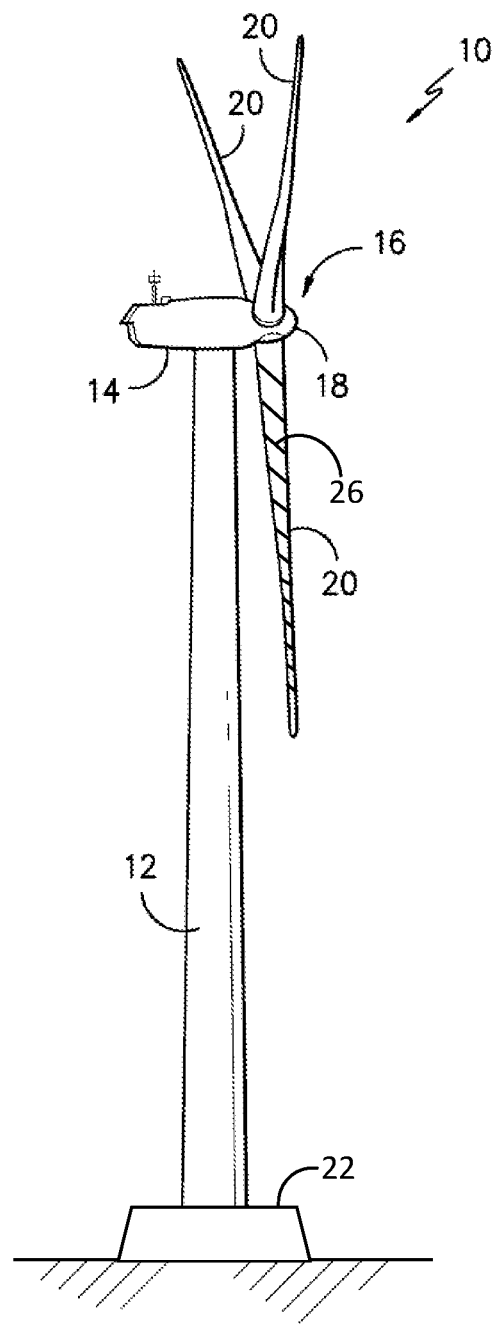
FIG. 1 illustrates a perspective view of a wind turbine with a blade configured with an add-on device.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of an embodiment of a wind turbine 10 with one of its blades 20 configured with an add-on device 26 according to the present disclosure. As shown, the wind turbine 10 generally includes a tower 12 with a ground-level base 22, a nacelle 14 mounted on the tower 12, and a rotor 16 coupled to the nacelle 14. The rotor 16 includes a rotatable hub 18 and rotor blades 20 coupled to and extending outwardly from the hub 18. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotationally coupled to an electric generator positioned within the nacelle 14 to permit electrical energy to be produced.

For purposes of the present disclosure, the term "nacelle" is used herein to include machine head components (e.g., drive train components, generator, etc.) located within the nacelle housing and the hub 18 components.

The add-on device 26 depicted on one of the blades in FIG. 1 may serve different purposes and have varying designs. For example, the add-one device 26 may be designed as a device intended to remain on the blade during operation to enhance aerodynamic performance of the blade. Alternatively, the add-on device may be designed as a temporary device intended to minimize vibrations in the blade during a non-operational condition of the wind turbine, for example when the rotor 16 is in a locked or idling state, or when the rotor cannot be yawed. It should be appreciated that the present invention is not limited to the type or purpose of the add-on device 26. For purposes of explanation only, the add-on device 26 is depicted and described herein as a vibration suppression device intended to suppress or damp vibrations in the blades 20.

The present disclosure is directed to various method embodiments for installing the continuous, pliant, add-on device 26 onto one or more blades 20 of the wind turbine 10. The add-on device is "pliant" to the extent that it can wrap around and conform to the blades 20. The add-on device 26 is "continuous" in that it has a length between a first end and a second end that enables wrapping the device 26 in as many turns around the blade 20 as desired. The add-on device 26 may be formed by segments or sections that are joined together to form a continuous length, or may be a single component having a continuous unbroken length.

Figure 2:
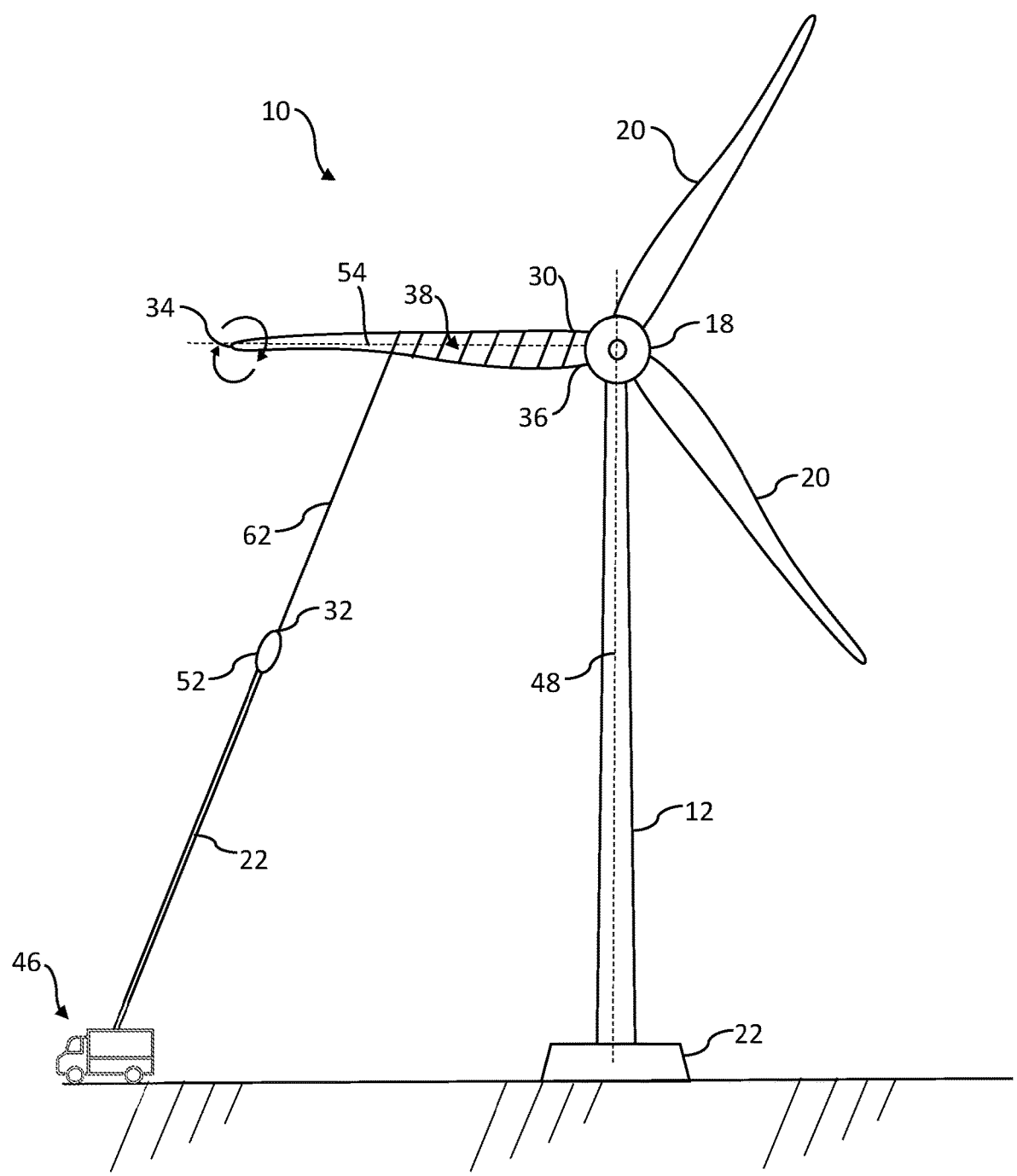
FIG. 2 is a view of an add-on device being supplied from a ground level position and wrapped around the wind turbine blade.

Referring to FIG. 2 in general, the method includes rotating the rotor 16 (and thus, the hub 18) to the position the blade 20 to a first position desired for the installation process. In FIG. 2, for example, the blade 20 is positioned essentially horizontal to ground (i.e., at the 3 o'clock or 9 o'clock position). A first end 30 of the add-on device 26 is fastened to a first end 36 of the blade 20 by any suitable attachment means. In a particular embodiment, the first end corresponds to the root end of the blade. This can be done, for example, by a person within the rotor 16 accessing the blade root 36 through an access hatch in the nacelle 14 or rotor hub 18.

The method includes subsequently rotating the blade 20 as indicated by the arrows in FIG. 2 using the wind turbine pitch control system while supplying the add-on device 26 in a first direction along a span 54 of the rotating blade 20. This action causes the add-on device to wrap around the blade 20 towards an opposite second end 34 of the blade 20 in a first wrap pattern 38. The second end may correspond to the tip end of the blade It should be appreciated that the spacing between the wraps in the first wrap pattern 38 will depend on the speed of rotation of the blade 20 and the speed of advancement of the add-on device 26 along the span-wise direction of the blade 20.

For purposes of example only, the various embodiments described herein attach the first end of the add-on device 26 to the root end of the blade and wrap the device towards the tip end of the blade in the first wrap pattern.

As described in greater detail below with reference to FIGS. 3a-3f, after completion of the first wrap pattern 38 at the tip end 34 of the blade 20, it may be desired to supply the add-on device 26 in an opposite second span-wise direction (i.e., back towards the blade root 36) to wrap the add-on device 26 around the blade 20 back towards the root end 36 of the blade in a second wrap pattern.

Still referring to FIG. 2, an embodiment of the method may include controlling the paying out and advance of the add-on device 26 at a ground level position proximate to the base 22 of the tower 12. For example, the add-on device 26 may be supplied and paid-out by a technician or from a vehicle that moves in the span-wise direction of the blade 20.

Figure 3B:
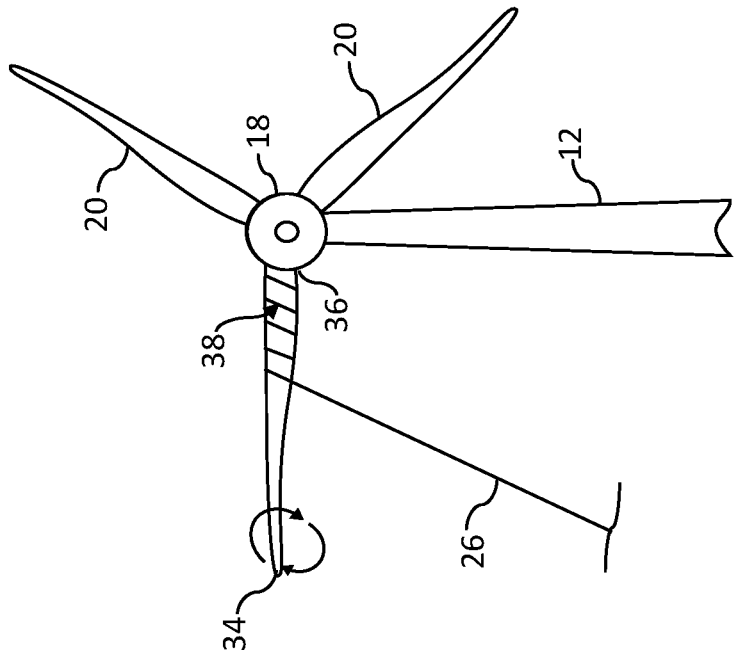
Figure 3A:
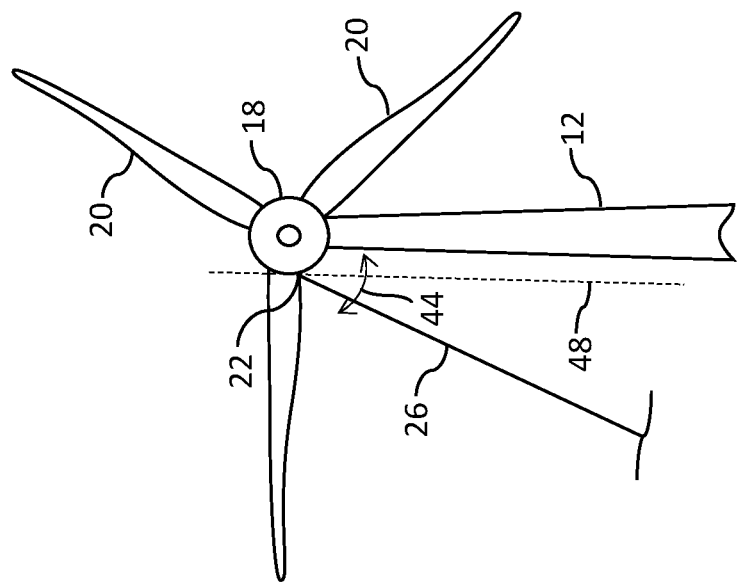
Figure 3D:
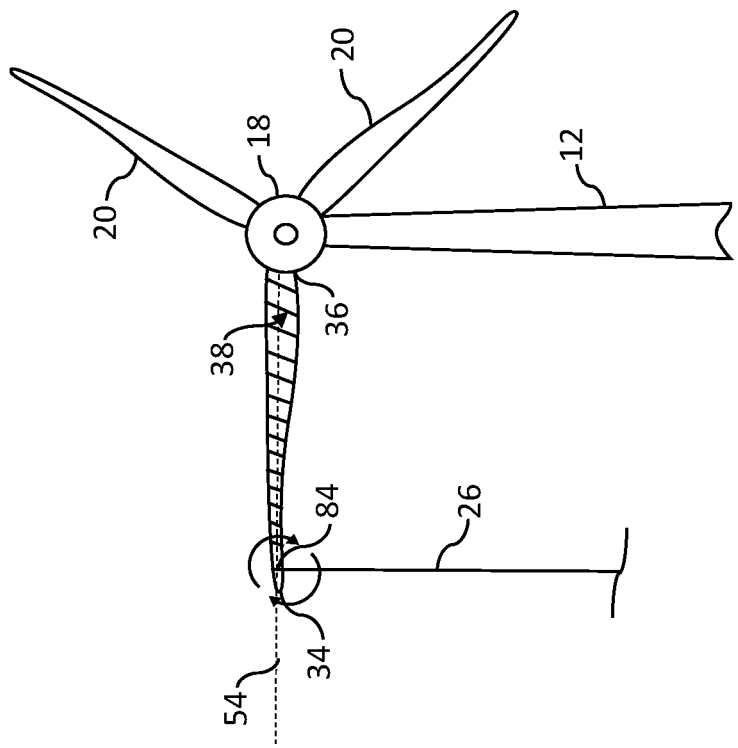
Figure 3C:
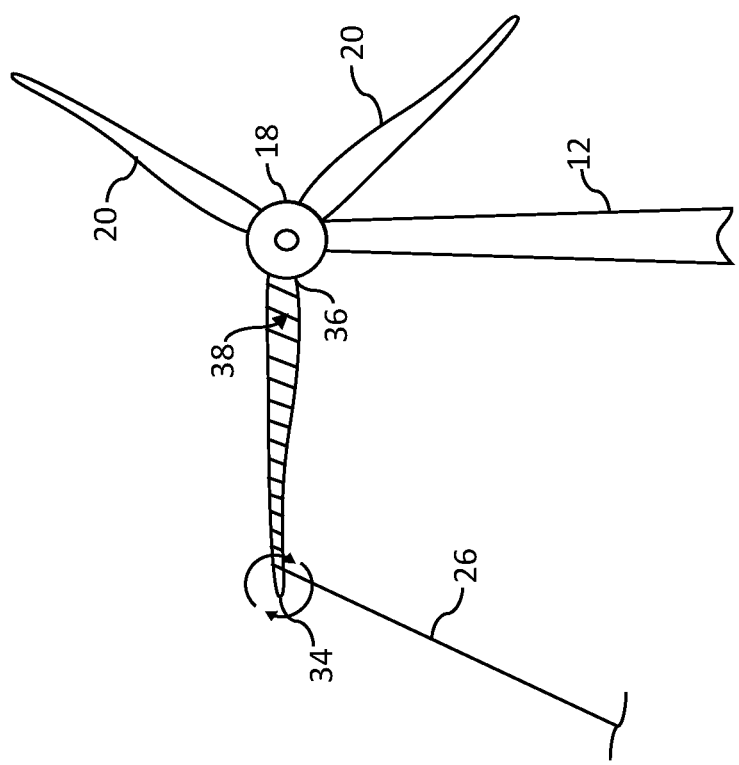

Referring to the sequential depictions of FIGS. 3a-3f, the method may include orienting the add-on device 26 at a first downward angle 44 away from a longitudinal axis 48 of the tower (FIG. 3a) while rotating the blade 20 and paying out the add-on device 26 to wrap the add-on device 26 around the blade 20 in the first wrap pattern 38 (FIG. 3b). The first wrapping 38 may continue until the add-on device reaches the tip end 34 of the blade 20 (FIG. 3c).

Referring to FIG. 3d, once the add-on device 26 has been wrapped to a first position at or near the tip end 34 of the blade 20, the add-on device 26 may be oriented generally perpendicular to the span-wise axis 54 of the blade 20 while rotating the blade with the pitch control system to create a chord-wise wrap 84 of the add-on device 26 around the blade 20 before the add-on device 26 starts to wrap around the blade 20 back to the root end 36 of the blade.

Referring to FIG. 3e, after forming the chord-wise wrap 84, the add-on device 26 may be oriented to a second downward angle 46 relative to the tower axis 48 towards the tower 12. With the device 26 oriented at this angle and advanced in the opposite span-wise direction of the blade (e.g., by reversing the direction of the ground vehicle or other pay-out system) and continued rotation of the blade 20 around its pitch axis, the add-on device 26 wraps around the blade 20 back towards the root end 36 of the blade in a second wrap pattern 40.

FIG. 3f depicts completion of the second wrap pattern 40 over the first wrap pattern 38 wherein the second end 32 of the add-on device 26 is at or near the root end 36 of the blade 20. The second end 32 can then be tied off or otherwise secured to the root end 36 of the blade 20 using any suitable means.

Figure 7:
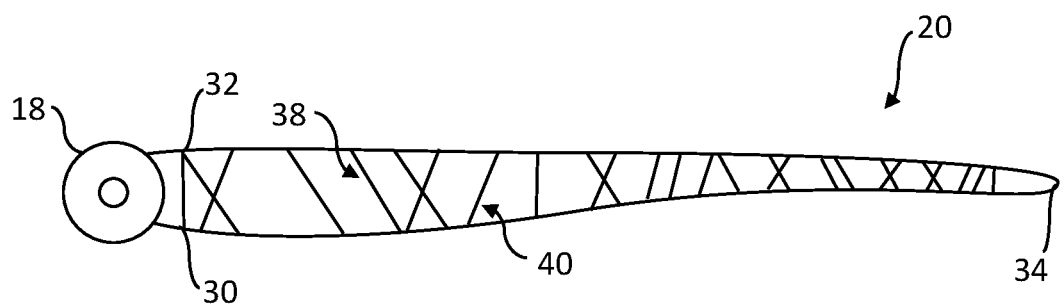
FIG. 7 is a view depicting another wrap pattern of the add-on device on the wind turbine blade.

The first wrap angle 44 and second wrap angle 46 may be maintained constant during wrapping of the add-on device 26 so that the wrap patterns 38, 40 are uniform along the blade 20, as depicted in FIGS. 3a-3f. Alternatively, either one or both of wrap angles 44, 46 may be varied during wrapping of the add-on device 26 so that the wrap pattern 38, 40 is non-uniform along the blade 20, as depicted in FIG. 7.

Figure 4B:
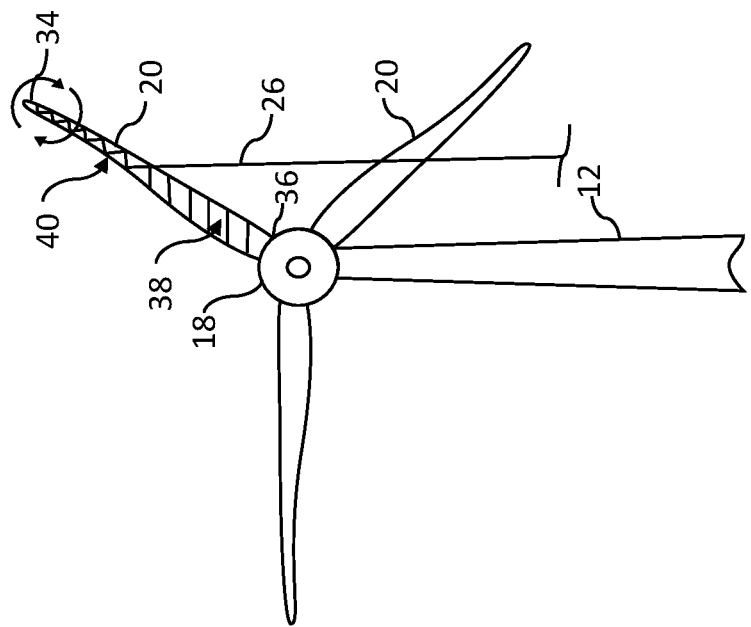
FIGS. 4a and 4b are sequential views of an alternative embodiment for wrapping the add-on device around the wind turbine blade.
Figure 4A:
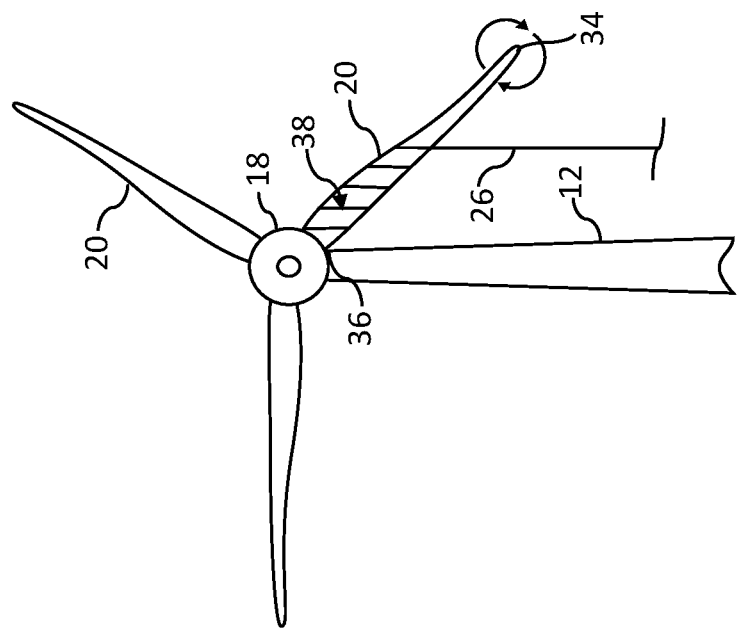

FIGS. 4a and 4b depict an alternative method wherein the rotor (and hub 18) is rotated to move the blade from the first position (e.g., a 5 o'clock position) to a second position (e.g., a 2 o'clock position) for wrapping the add-on device 26 in the second wrap pattern 40. With this embodiment, the second wrap pattern is generated by changing the rotated position of the blade 20 and not necessarily the angle of the add-on device 26 relative to the tower 12. The add-on device 26 can be maintained at a generally constant orientation (e.g., a vertical orientation) from a ground-level control position for wrapping the add-on device 26 in the first 38 and second 40 wrap patterns.

As discussed above with reference to FIG. 2, various embodiments of the method may include attaching an extension line 50 to the second end 32 of the add-on device 26, wherein the extension line 50 has a length so as to be paid out from the ground level position 42 while the add-on device 26 wraps around the blade 20. The extension line 50 may be controlled at the ground level position 42 proximate to the tower base 22 to orient the add-on device 26 at the first angle 44 and the second angle 46 while wrapping the add-on device 26 around the blade 20. The extension line 50 can be disconnected from the second end 32 of the add-on device 26 after completing the second wrap pattern 40 and connected to the blade 20, for example at the root end 36 of the blade 20.

The present invention also encompasses various methods for uninstalling the add-on device from the blade 20 in an essentially reverse procedure. For removing the add-on device 26, the extension line 50 can be reattached to the second end 32 of the device 26 by a technician at the root end of the blade and the add-on device can be removed by reversing the process described above.

Figure 5:
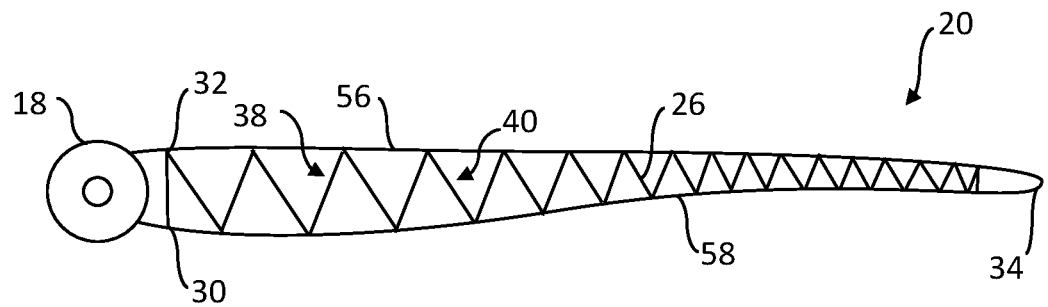
FIG. 5 is a view depicting a particular wrap pattern of the add-on device on the wind turbine blade.

FIG. 5 depicts an embodiment of the method wherein the first wrap pattern 38 and the second wrap pattern 40 cross at the trailing 58 and leading 56 edges of the blade.

Figure 6:
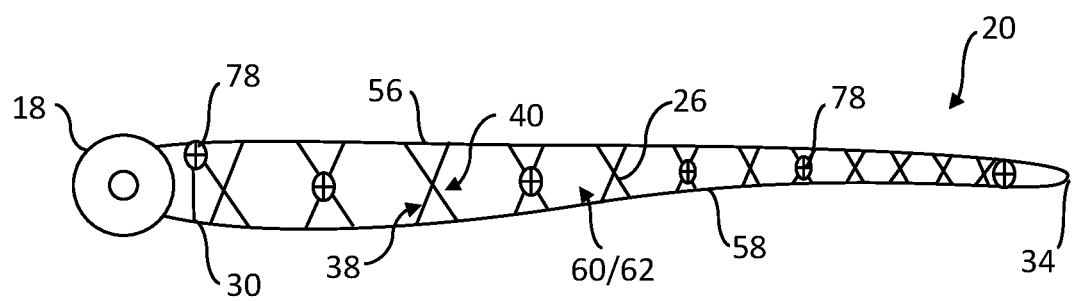
FIG. 6 is a view depicting an alternative wrap pattern of the add-on device on the wind turbine blade.

FIG. 6 depicts an embodiment of the method wherein the first wrap pattern 38 and the second wrap pattern 40 cross on the pressure and suction side surfaces 60, 62 of the blade 20.

Figure 8:
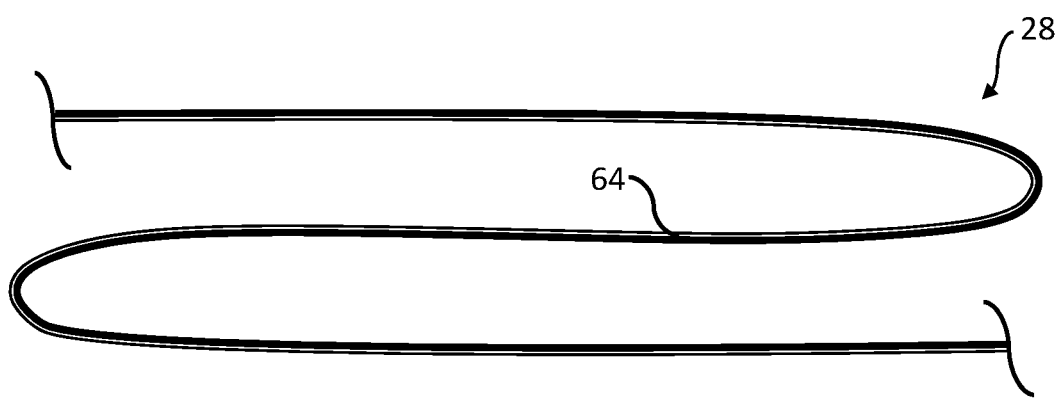
FIG. 8 is a view of an embodiment of an add-on device.
Figure 9:
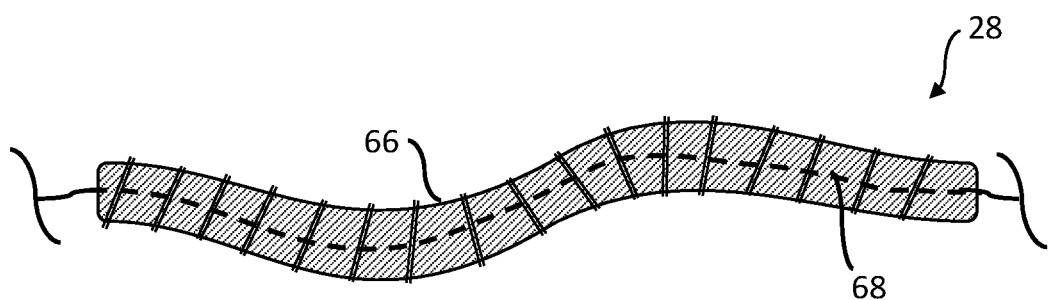
FIG. 9 is a view of a different embodiment of an add-on device.
Figure 10:
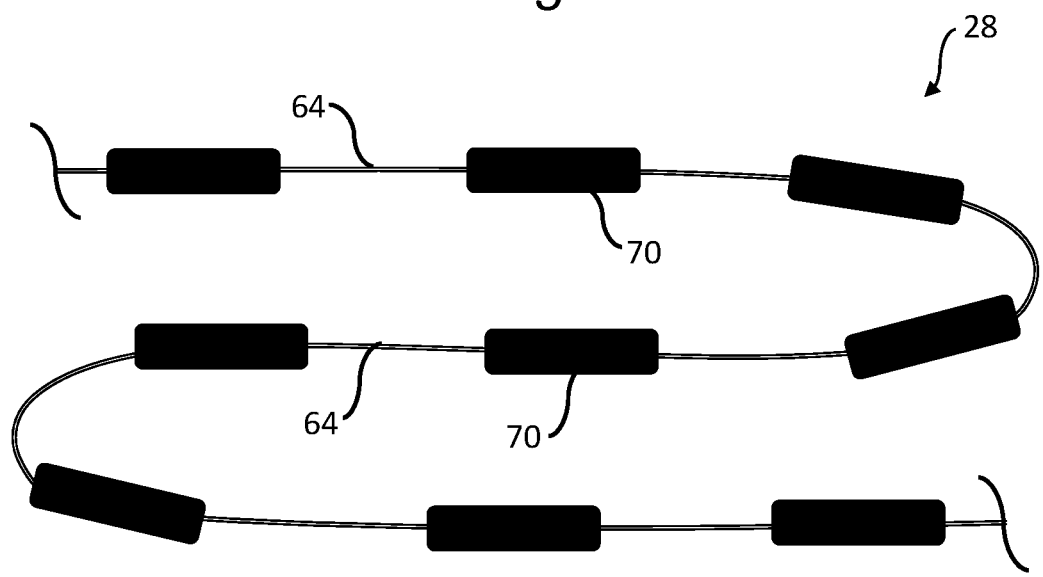
FIG. 10 is a view of another embodiment of an add-on device.

Referring to FIGS. 8-10, as mentioned, the add-on device 26 can vary in size, shape, design, and purpose within the scope of the present methods. In the depicted embodiments, the add-on device is a vibration suppression device 28 that is temporarily attached to the blades 20. In FIG. 8, the vibration suppression device 28 is a continuous rope-like or hose-like structure having a generally uniform cross-sectional shape along the length thereof.

In the embodiment of FIG. 9, the add-on device is formed as a tubular structure 66 that wraps around leading and trailing edges of the blade. This tubular structure 66 may include a wrapped shaping wire such that the tubular structure 66 is expandable and retractable in the lengthwise direction. The tubular structure 66 may include and internal wire 68 that limits the degree of elongation of the flexible tubular structure 66. The tubular structure 66 is secured to the internal wire 68 with an initial desired degree of elongation of the tubular structure that allows the tubular structure to essentially collapse on itself wherein the tubular structure 66 folds around the leading or trailing edge of the rotor blade. In certain embodiments, the tubular structure need not be present along the entire length of the add-on device 26. For example, the tubular structure may only be present along the portion of the add-on device that wraps around a defined span-wise length of the blade adjacent to the tip end of the blade (e.g., a third of the blade length adjacent to the tip end).

In the embodiment depicted in FIG. 10, the vibration suppression device 28 is embodied as a rope 64 with sections of increased diameter members 70 spaced apart along the rope 64. This type of vibration suppression 28 device can be wrapped around the blade such that the increased diameter members 70 lie against suction and pressure sides of the blades and the rope 64 wraps around the leading and trailing edges of the blade.

In other embodiments, the vibration suppression device 28 may be a continuous rope-like member having various geometric cross-sectional shapes, such as circular, multi-faceted, triangular, T-shaped, star-shaped, and so forth.

Figure 11:
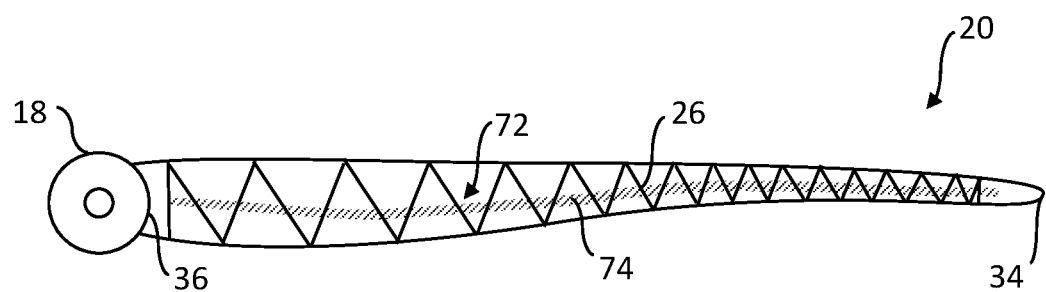
FIG. 11 is a view of a wind turbine blade with means to minimize slippage of the add-on device along the blade.
Figure 12:
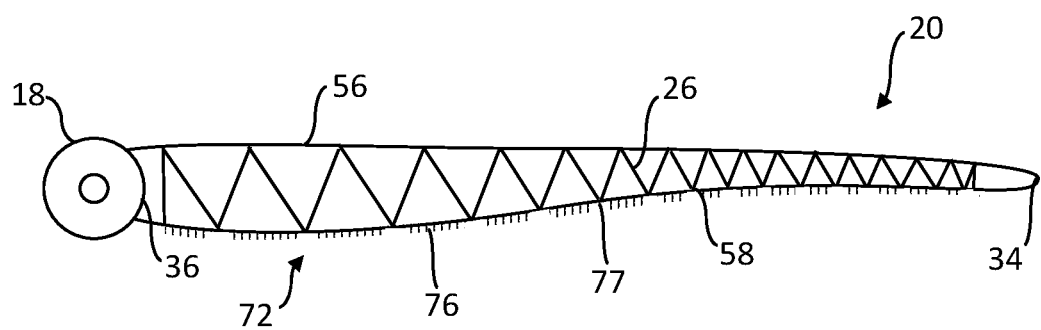
FIG. 12 is a view of a wind turbine blade with other means to minimize slippage of the add-on device along the blade.

Referring to FIGS. 11 and 12, embodiments of the method may include providing means 72 to prevent or minimize slippage of the add-on device 26 along the blade 20 so as to maintain the wrap patterns 38, 40 of the add-on device 26 along the length of the blade 20. In the embodiment of FIG. 11, the means 72 is provided by serrations 74 (or other surface characteristics) defined in the blade 20 along at least a portion of the span-wise length of the blade 20. These serrations 74 present a non-slip surface to the add-on device 26.

In the embodiment depicted in FIG. 12, the blade 20 includes aerodynamic devices or features 76 (e.g., tabs or slots) defined along the trailing edge 58 of the blade 20. The means 72 includes spaced-apart gaps 77 defined between the aerodynamic devices 76 along the trailing edge 58. These gaps 77 provide a space for the add-on device 26 to wrap around the trailing edge 58, thus preventing slippage of the add-on device 26 along the blade 20.

Referring to FIG. 6, anchor devices 78 may be attached to the blade 20, wherein the add-on device 26 is attached to the anchoring devices 78. The anchor devices 78 may be temporary or permanently attached to the blade 20 and do not affect aerodynamic performance of the blade 20. In an alternate embodiment, the anchor devices 78 may be secured on the add-on device 26 in a spaced-apart pattern. The devices 78 may be made of any suitable friction-enhancing material so that they form a frictional interface with the suction or pressure side of the blade and prevent slippage of the add-on device 26 along the blade. These anchor devices 78 may also serve as a member against which the add-on device 26 can bear in the second wrap pattern (and thus prevent slippage of the second wrap pattern). In this case, the anchor devices 78 may only be necessary on about half of the length of the add-on device.

Figure 13:
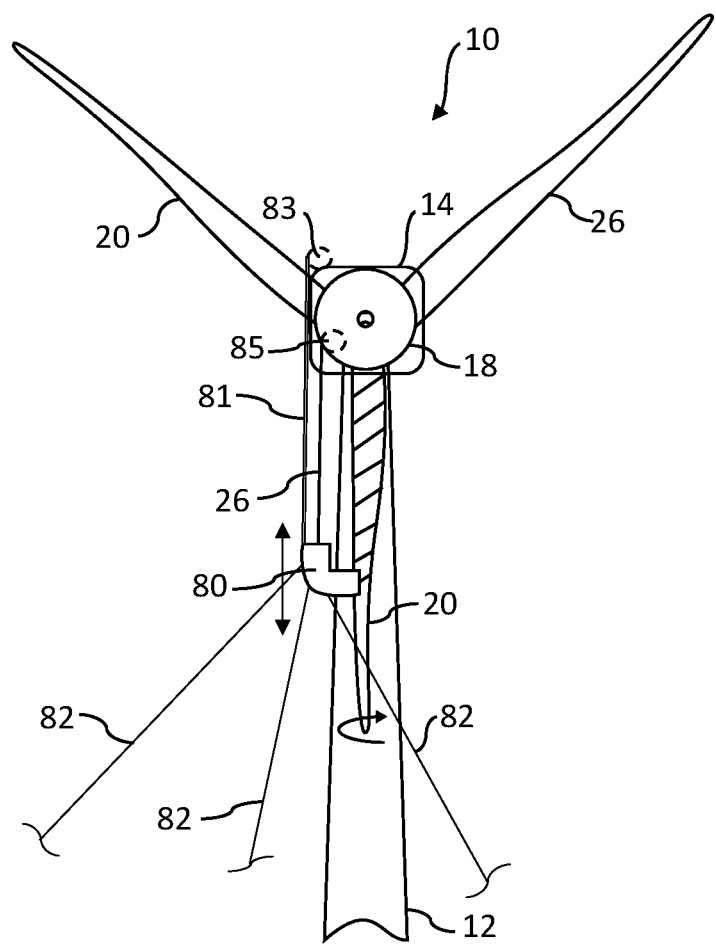
FIG. 13 is a view depicting an alternative method embodiment for wrapping an add-on device around a wind turbine blade.

FIG. 13 depicts an embodiment of the present method wherein the add-on device 26 is supplied from a source 85 (e.g., a reel) at the root end of the blade 20 through a diverter device 80 that is positioned adjacent to the blade 20. This diverter device 80 is controlled with a line 81 from a source 83 (e.g., a reel) by personnel on or in the nacelle 14, rotor 16, or hub 18 and is lowered towards the tip end 20 as the blade 20 rotates to wrap the add-on device 26 in the first wrap pattern. Position of the diverter device 80 may be maintained relative to the blade 20 via one or more tag lines 82 attached to the diverter 80 and controlled at ground level. Aafter completion of the first wrap pattern, the diverter device 80 may be raised along the blade 20 while supplying the add-on device 26 through the diverter 80 to wrap the add-on device around the blade 20 back towards the root end of the blade 20 in the second wrap pattern.

The present invention also encompasses the individual rotor blades having one or more of the add-on device wrapped therearound, as described herein.

Further aspects of the invention are provided by the subject matter of the following clauses:

Clause 1: A method for installing a continuous pliant add-on device onto a blade of a wind turbine, wherein the blade is mounted to a rotor that is atop a tower, the method comprising: with the rotor, positioning the blade to a first position; fixing a first end of the add-on device to a first end of the blade; and rotating the blade with a pitch control system while supplying the add-on device in a first direction along a span of the rotating blade to wrap the add-on device around the blade towards an opposite second end of the blade in a first wrap pattern.

Clause 2: The method according to clause 1, wherein the first end of the blade is the root end and the opposite second end of the blade is the tip end, the method further comprising, after completion of the first wrap pattern, supplying the add-on device in an opposite second direction to wrap the add-on device around the blade back towards the root end of the blade in a second wrap pattern.

Clause 3: The method according to any one of clauses 1-2, wherein the blade is maintained at the first position for wrapping the add-on device in the first and second wrap patterns.

Clause 4: The method according to any one of clauses 1-3, wherein the rotor is rotated to move the blade from the first position to a second position for wrapping the add-on device in the second wrap pattern, wherein at a ground-level position proximate to a base of the tower, the add-on device is maintained at a generally constant orientation for wrapping the add-on device in the first and second wrap patterns.

Clause 5: The method according to any one of clauses 1-4, further comprising, at a ground level position proximate to a base of the tower, orienting the add-on device at a first downward angle away from a longitudinal axis of the tower while rotating the blade and paying out the add-on device to wrap the add-on device around the blade in the first wrap pattern.

Clause 6: The method according to any one of clauses 1-5, wherein the first angle is maintained constant during wrapping of the add-on device so that the first wrap pattern is uniform along the blade, or wherein the first angle is varied during wrapping of the add-on device so that the first wrap pattern is non-uniform along the blade.

Clause 7: The method according to any one of clauses 1-6, wherein an extension line is attached to a second end of the add-on device, the extension line having a length so as to be paid out from the ground level position while the add-on device wraps around the blade.

Clause 8: The method according to any one of clauses 1-7, further comprising: once the add-on device has been wrapped to a first position at or near the opposite second end of the blade, orienting the add-on device to a second downward angle relative to the longitudinal axis of the tower back towards the tower; and rotating the blade with the pitch control system to wrap the add-on device around the blade back towards the first end of the blade in a second wrap angle.

Clause 9: The method according to any one of clauses 1-8, further comprising: prior to orienting the add-on device to the second downward angle, orienting the add-on device generally perpendicular to a span-wise axis of the blade while rotating the blade with the pitch control system to create a chord-wise wrap of the add-on device around the blade before the add-on device starts to wrap around the blade back to the first end of the blade.

Clause 10: The method according to any one of clauses 1-9, wherein an extension line is attached to the second end of the add-on device and controlled at a ground level position proximate to a base of the tower to orient the add-on device at the first angle and the second angle while wrapping the add-on device around the blade, wherein the extension line is disconnected from the second end of the add-on device after completing the second wrap pattern and connected to the blade.

Clause 11: The method according to any one of clauses 1-10, wherein the first wrap pattern and the second wrap pattern cross at trailing and leading edges of the blade or cross at suction and pressure sides of the blade.

Clause 12: The method according to any one of clauses 1-11, wherein the add-on device is configured as a vibration suppression device in a form of: a rope, a hose, or a flexible tubular structure that wraps around leading and trailing edges of the blade, the flexile tubular structure including an internal line that limits elongation of the flexible tubular structure.

Clause 13: The method according to any one of clauses 1-12, wherein the add-on device is configured as a vibration suppression device in a form of a rope with sections of increased diameter members spaced apart along the rope, the suppression device wrapped around the blade such that the increased diameter members lie against suction and pressure sides of the blades and the rope is wrapped around leading and trailing edges of the blade.

Clause 14: The method according to any one of clauses 1-13, further comprising providing means to minimize slippage of the add-on device along the blade so as to maintain the first wrap pattern of the add-on device.

Clause 15: The method according to any one of clauses 1-14, wherein the means comprise serrations defined in the blade along at least a portion of a span-wise length of the blade.

Clause 16: The method according to any one of clauses 1-15, wherein the blade includes aerodynamic devices defined along a trailing edge of the blade, the means comprising gaps defined between the aerodynamic devices in which the add-on device wraps around the trailing edge.

Clause 17: The method according to any one of clauses 1-16, wherein the means comprises anchor devices attached to the blade, wherein the anchor devices are temporary or permanently attached to the blade and do not affect aerodynamic performance of the blade.

Clause 18: The method according to any one of clauses 1-17, comprising supplying the add-on device from the first end of the blade through a diverter positioned adjacent to the blade, the diverter lowered towards the opposite second end as the blade rotates to wrap the add-on device in the first wrap pattern.

Clause 19: The method according to any one of clauses 1-18, comprising holding the diverter relative to the blade via a tag line attached to the diverter, the tag line controlled at a ground level position.

Clause 20: The method according to any one of clauses 1-19, further comprising, after completion of the first wrap pattern, raising the diverter along the blade while supplying the add-on device through the diverter to wrap the add-on device around the blade back towards a root end of the blade in a second wrap pattern.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for installing a continuous pliant add-on device onto a blade of a wind turbine, wherein the blade is mounted to a rotor that is atop a tower, the method comprising:
   with the rotor, positioning the blade to a first position;
   fixing a first end of the add-on device to a first end of the blade; and
   rotating the blade with a pitch control system while supplying the add-on device in a first direction along a span of the rotating blade to wrap the add-on device around the blade towards an opposite second end of the blade in a first wrap pattern.

2. The method according to claim 1, further comprising, at a ground level position proximate to a base of the tower, orienting the add-on device at a first downward angle away from a longitudinal axis of the tower while rotating the blade and paying out the add-on device to wrap the add-on device around the blade in the first wrap pattern.

3. The method according to claim 2, further comprising:
   once the add-on device has been wrapped to a first position at or near the opposite second end of the blade, orienting the add-on device to a second downward angle relative to the longitudinal axis of the tower back towards the tower; and
   rotating the blade with the pitch control system to wrap the add-on device around the blade back towards the first end of the blade in a second wrap angle.

4. The method according to claim 3, wherein an extension line is attached to the second end of the add-on device and controlled at a ground level position proximate to a base of the tower to orient the add-on device at the first angle and the second angle while wrapping the add-on device around the blade, wherein the extension line is disconnected from the second end of the add-on device after completing the second wrap pattern and connected to the blade.

5. The method according to claim 4, wherein the first wrap pattern and the second wrap pattern cross at trailing and leading edges of the blade or cross at suction and pressure sides of the blade.

6. The method according to claim 3, further comprising:
prior to orienting the add-on device to the second downward angle, orienting the add-on device generally perpendicular to a span-wise axis of the blade while rotating the blade with the pitch control system to create a chord-wise wrap of the add-on device around the blade before the add-on device starts to wrap around the blade back to the first end of the blade.

7. The method according to claim 2, wherein the first angle is maintained constant during wrapping of the add-on device so that the first wrap pattern is uniform along the blade, or wherein the first angle is varied during wrapping of the add-on device so that the first wrap pattern is non-uniform along the blade.

8. The method according to claim 2, wherein an extension line is attached to a second end of the add-on device, the extension line having a length so as to be paid out from the ground level position while the add-on device wraps around the blade.

9. The method according to claim 1, further comprising providing means to minimize slippage of the add-on device along the blade so as to maintain the first wrap pattern of the add-on device.

10. The method according to claim 9, wherein the means comprise serrations defined in the blade along at least a portion of a span-wise length of the blade.

11. The method according to claim 9, wherein the blade includes aerodynamic devices defined along a trailing edge of the blade, the means comprising gaps defined between the aerodynamic devices in which the add-on device wraps around the trailing edge.

12. The method according to claim 9, wherein the means comprises anchor devices attached to the blade, wherein the anchor devices are temporary or permanently attached to the blade and do not affect aerodynamic performance of the blade.

13. The method according to claim 1, wherein the first end of the blade is the root end and the opposite second end of the blade is the tip end, the method further comprising, after completion of the first wrap pattern, supplying the add-on device in an opposite second direction to wrap the add-on device around the blade back towards the root end of the blade in a second wrap pattern.

14. The method according to claim 13, wherein the blade is maintained at the first position for wrapping the add-on device in the first and second wrap patterns.

15. The method according to claim 13, wherein the rotor is rotated to move the blade from the first position to a second position for wrapping the add-on device in the second wrap pattern, wherein at a ground-level position proximate to a base of the tower, the add-on device is maintained at a generally constant orientation for wrapping the add-on device in the first and second wrap patterns.

16. The method according to claim 1, comprising supplying the add-on device from the first end of the blade through a diverter positioned adjacent to the blade, the diverter lowered towards the opposite second end as the blade rotates to wrap the add-on device in the first wrap pattern.

17. The method according to claim 16, comprising holding the diverter relative to the blade via a tag line attached to the diverter, the tag line controlled at a ground level position.

18. The method according to claim 16, further comprising, after completion of the first wrap pattern, raising the diverter along the blade while supplying the add-on device through the diverter to wrap the add-on device around the blade back towards the first end of the blade in a second wrap pattern.

19. The method according to claim 1, wherein the add-on device is configured as a vibration suppression device in a form of: a rope, a hose, or a flexible tubular structure that wraps around leading and trailing edges of the blade, the flexile tubular structure including an internal line that limits elongation of the flexible tubular structure.

20. The method according to claim 1, wherein the add-on device is configured as a vibration suppression device in a form of a rope with sections of increased diameter members spaced apart along the rope, the suppression device wrapped around the blade such that the increased diameter members lie against suction and pressure sides of the blades and the rope is wrapped around leading and trailing edges of the blade.

* * * * *